United States Patent
Rihn

(10) Patent No.: US 9,478,109 B2
(45) Date of Patent: Oct. 25, 2016

(54) VIRTUAL SENSOR IN A VIRTUAL ENVIRONMENT

(71) Applicant: Immersion Corporation, San Jose, CA (US)

(72) Inventor: William Rihn, San Jose, CA (US)

(73) Assignee: IMMERSION CORPORATION, San Jose, CA (US)

( * ) Notice: Subject to any disclaimer, the term of this patent is extended or adjusted under 35 U.S.C. 154(b) by 4 days.

(21) Appl. No.: 14/584,025

(22) Filed: Dec. 29, 2014

(65) Prior Publication Data

US 2016/0189493 A1   Jun. 30, 2016

(51) Int. Cl.
| | |
|---|---|
| H04B 3/36 | (2006.01) |
| G08B 6/00 | (2006.01) |
| G06T 15/00 | (2011.01) |
| G06F 3/01 | (2006.01) |

(52) U.S. Cl.
CPC ............. *G08B 6/00* (2013.01); *G06F 3/016* (2013.01); *G06T 15/00* (2013.01)

(58) Field of Classification Search
CPC . G06F 3/011; G06F 3/0346; G06F 2203/013
USPC ............. 340/407.1, 4.12; 273/108.1, 317.1; 463/2, 49
See application file for complete search history.

(56) References Cited

U.S. PATENT DOCUMENTS

| | | | | |
|---|---|---|---|---|
| 2005/0017454 A1* | 1/2005 | Endo | ............... | G06F 3/016 273/317.1 |
| 2013/0293584 A1* | 11/2013 | Anderson | ............... | G06T 11/00 345/633 |
| 2014/0062682 A1* | 3/2014 | Birnbaum | ............... | G08B 6/00 340/407.2 |
| 2014/0333625 A1 | 11/2014 | Itkowitz | | |
| 2014/0347270 A1 | 11/2014 | Birnbaum | | |
| 2015/0024368 A1* | 1/2015 | King, Jr. | ............... | G09B 5/02 434/365 |
| 2015/0130707 A1* | 5/2015 | Da Costa | ............... | A63F 13/23 345/156 |

OTHER PUBLICATIONS

J. Hildenbrand; "Immersion releases MOTIV SDK to Android developers, takes haptic feedback to the next level"; Mar. 8, 2011; http://www.androidcentral.com/immersion-releases-motiv-sdk-android-developers-takes-haptic-reedback-next-level.

* cited by examiner

*Primary Examiner* — Phung Nguyen
(74) *Attorney, Agent, or Firm* — Miles & Stockbridge P.C.

(57) ABSTRACT

A system for generating haptic effects includes a virtual environment having environmental properties, virtual objects, and object property information. A programmatic virtual sensor is placed on a virtual object in the virtual environment. A rendering engine for the virtual environment renders the virtual environment. A module for the virtual sensor receives virtual sensor data including position and time for the sensor and calculates sensor output data including acceleration data and object interaction data for the virtual sensor. A haptic track generator generates a haptic track based on the sensor output data.

23 Claims, 7 Drawing Sheets

VIRTUAL SENSOR IN A VIRTUAL ENVIRONMENT

FIELD

One embodiment is directed to a virtual sensor. More particularly, one embodiment is directed to a virtual sensor for haptics generation in a virtual environment.

BACKGROUND INFORMATION

Sensor haptics can be used to quickly and realistically generate haptic effects. For example, sensors can be added to real-world objects and gather data about the physics of how the objects interact in their environment. Sensor data can be used to author haptic effects to accompany filmed or authored environments that have similar interactions as those captured with sensor data.

A haptic designer may develop haptic information for playback on one or more haptic output devices based on sensor data. In authored environments, like a three dimensional ("3D") animated movie or show or 3D-scape game, a haptic designer can incorporate sensor data in developing haptic effects. Haptic effects can be determined using sensor data along with the haptic designer's expertise and experience. The haptic designer can create a haptic track, which when played on a haptic output device will produce haptic effects.

SUMMARY

One embodiment is a system for generating haptic effects in a virtual environment with environmental properties, virtual objects, and object property information. A programmatic virtual sensor is placed on a virtual object in the virtual environment. A rendering engine for the virtual environment renders the virtual environment. A module for the virtual sensor receives virtual sensor data including position and time for the sensor and calculates sensor output data including acceleration data and object interaction data for the virtual sensor. A haptic track generator generates a haptic track based on the sensor output data.

DETAILED DESCRIPTION

Embodiments allow a designer to place one or more virtual sensors, rather than actual sensors, in an authoring environment. These virtual sensors can gather data within the environment and, using the gathered data, generate a haptic track for playback on a haptic device or for further editing. In some embodiments, an existing haptic effects track can be modified to provide enhanced haptic playback information.

Automatic haptic effect generation at the level of a physics engine using virtual sensors in a video game or other virtual environment can provide another layer of complexity of haptic effects that are altered by a spatialization engine. In addition, virtual sensors can generate entirely new haptic effects on-the-fly in real time rendered environments (or run time) or for later playback in produced rendered environments. Embodiments further include applications that run computer simulations of objects and environments. Other uses also include movie animation, such as in a 3D animated feature film. Because every action in an animated movie must be designed within an authoring tool or framework, simulating sensors to detect collisions or physics in accordance with embodiments enables the auto generation of a haptic track to reduce or remove the need to author one.

Figure 1:
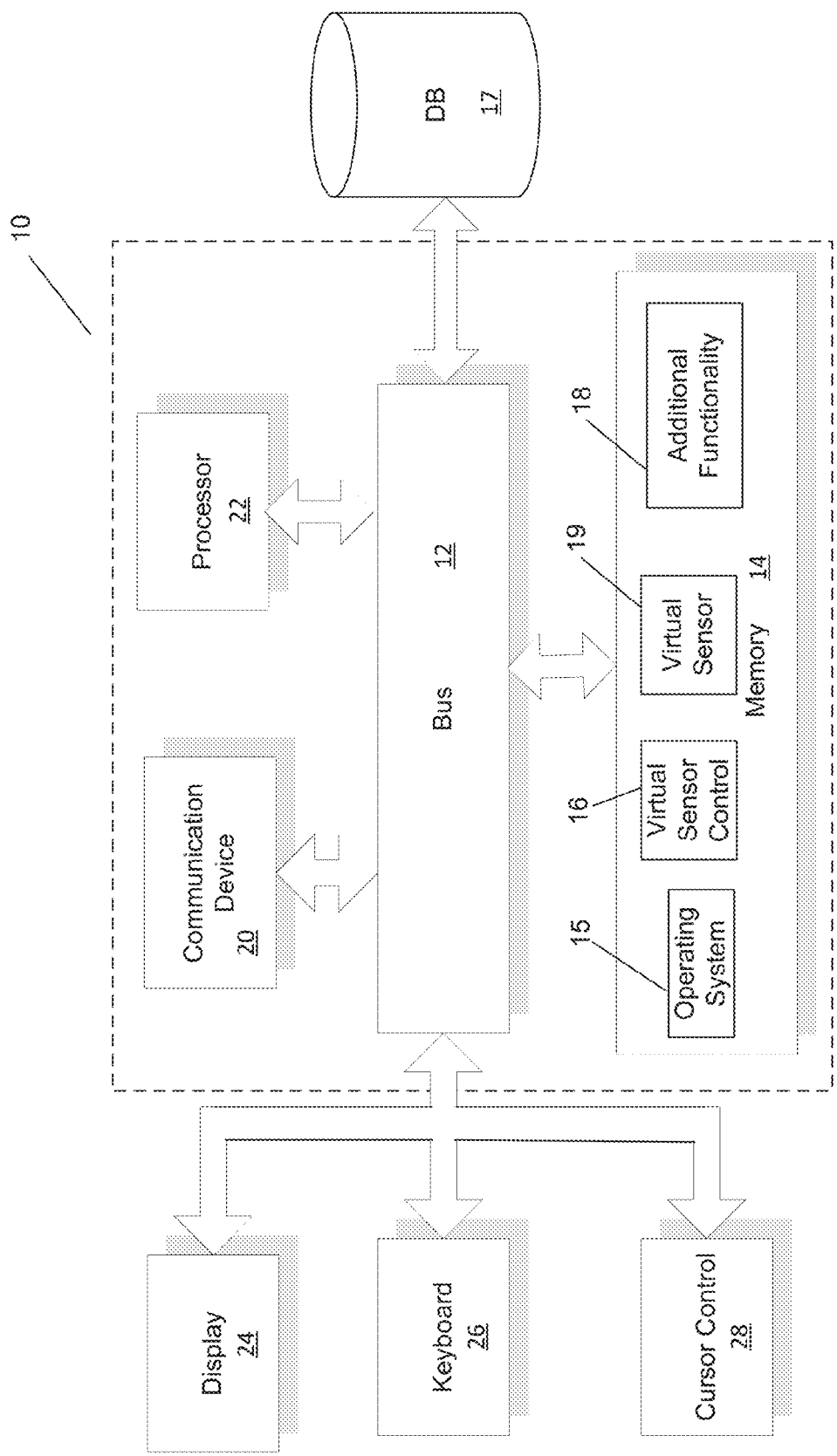
FIG. 1 is a block diagram of a computer server/system in accordance with an embodiment.

FIG. 1 is a block diagram of a computer server/system 10 in accordance with an embodiment. Although shown as a single system, the functionality of system 10 can be implemented as a distributed system. System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable media. System 10 further includes a communication device 20, such as a network interface card, to provide access to a network. Therefore, a user may interface with system 10 directly, or remotely through a network or any other known method.

Computer readable media may be any available media that can be accessed by processor 22 and includes both volatile and nonvolatile media, removable and non-removable media, and communication media. Communication media may include computer readable instructions, data structures, program modules or other data in a modulated data signal such as a carrier wave or other transport mechanism and includes any information delivery media.

Processor 22 is further coupled via bus 12 to a display 24, such as a Liquid Crystal Display ("LCD"). A keyboard 26 and a cursor control device 28, such as a computer mouse, are further coupled to bus 12 to enable a user to interface with system 10.

In one embodiment, memory 14 stores software modules that provide functionality when executed by processor 22. The modules include an operating system 15 that provides operating system functionality for system 10. The modules further include a virtual sensor control 16 that provides and processes data from a virtual sensor 19, as disclosed in more detail below. System 10 can be part of a larger system, such as a haptic output system, haptic playback system, or haptic creation system. Therefore, system 10 will typically include one or more additional functional modules 18 to include the additional functionality. A database 17 is coupled to bus 12 to provide centralized storage for modules 16 and 18 and store one or more data sets to support contextual data processing, etc. Some embodiments may not include all of the elements in FIG. 1.

A haptic output system (not pictured) can include actuators or other haptic output devices for outputting haptic effects. An actuator for example can be any type motor, including without limitation an Eccentric Rotating Mass ("ERM"), a Linear Resonant Actuator vibration motor ("LRA"), a piezoelectric motor, or a solenoid actuator. Other types of haptic output devices may be non-mechanical or non-vibratory devices such as devices that use electrostatic friction ("ESF"), ultrasonic surface friction ("USF"), devices that induce acoustic radiation pressure with an ultrasonic haptic transducer, devices that use a haptic substrate and a flexible or deformable surface or shape changing devices and that may be attached to a user's body, devices that provide projected haptic output such as a puff of air using an air jet, devices that provide electrical muscle stimulation, etc.

Haptic output devices can be contained in a hand held device such as a phone, tablet, or controller; a wearable device, such as a strap, glove, or clothing article; or directly attached to a user's skin through an adhesive or mechanical device. The haptic output system can decide what haptic effects are to be played and the order in which the effects are played based on high level parameters. In general, the high level parameters that define a particular haptic effect include magnitude, frequency, and duration. Low level parameters such as streaming motor commands could also be used to determine a particular haptic effect. A haptic effect may be considered "dynamic" if it includes some variation of these parameters when the haptic effect is generated or a variation of these parameters based on a user's interaction.

Figure 2:
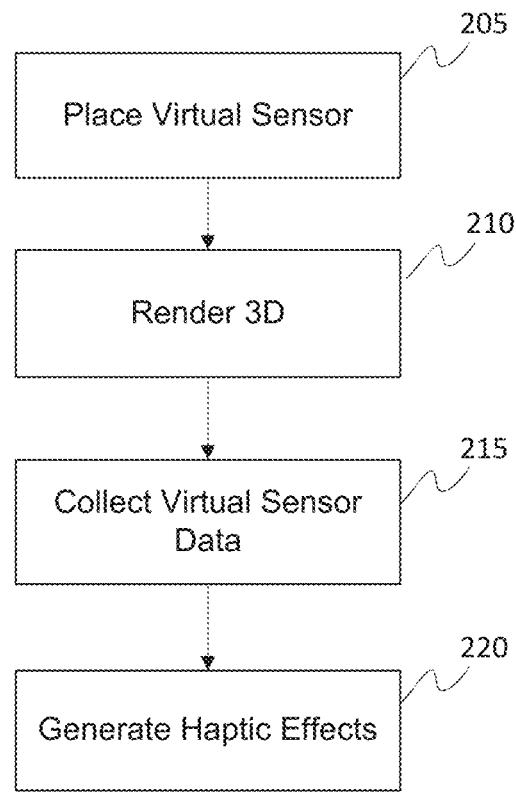
FIG. 2 is a flow diagram for a system of using virtual sensors to generate haptic effects in accordance with one embodiment.

FIG. 2 is a flow diagram for a system of using virtual sensors to generate haptic effects in accordance with one embodiment. In one embodiment, the functionality of the flow diagram of FIG. 2 (and FIGS. 3-5 below) is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 205, a virtual sensor, such as virtual sensor 19, is placed in a virtual environment. The virtual environment can be, for example, a two dimensional ("2D") or 3D video game engine, a video authoring program, a 3D modeling environment or workspace, a virtual reality environment, and the like. Virtual sensor 19 can be placed on an object in the virtual environment. The virtual sensor can be a special object within an authoring framework based on a plugin. It can be placed by dragging and dropping the sensor to the object or location on which it will be placed. As the object in the environment moves, the virtual sensor will also move, maintaining a fixed position relative to the object on which it is placed. In some embodiments virtual sensor 19 can be visible in an authoring software environment and invisible in a rendered software environment.

At 210, the virtual environment can be rendered. Depending on the type of environment, the rendering can be done in real time, such as with a video game with characters being controlled by controllers, or can be produced such as with a movie with computer generated interactive graphics. As the virtual environment is rendered, virtual sensor 19 will move about the environment either according to a script or according to input from a controller. The object on which virtual sensor 19 is placed can contact other virtual objects, such as characters, walls, floors, and so forth, during rendering.

At 215, virtual sensor data is collected. Data can include positional data (such as location data on three axes), other object data (especially object data from objects that come within a certain proximity of the virtual sensor), time data (fourth axis), and environmental data such as gravity, temperature, and so forth. From this data, haptic effects can be generated. At 220, haptic effects are generated. For example, if the virtual sensor, such as virtual sensor 19, is moving in a direction over a period of time, then over a short period of time change direction or stop, this can be calculated as a sharp deceleration qualifying for a particular type of haptic effect.

In some embodiments, the virtual sensor, such as virtual sensor 19, can have associated with it particular haptic effects. For example, a developer can place a virtual sensor at a point that will produce a rumble haptic effect and another virtual sensor at the same point (or a different point) that will produce a poke haptic effect, and so forth.

As part of the generation of haptic effects at 220, the virtual sensor module 16 can use other information available in the environment to tailor haptic effects more specifically. For example, in a virtual environment where the gravity property has been set to be one third Earth gravity, a haptic effect can be less intense when the sensor detects a change in a downward motion, since the gravitational acceleration force is less in that environment as compared to an environment with Earth gravity. As another example of the type of information available in the environment, a floor can have a property of being rough, and a sensor that moves in close proximity to the floor can be determined to be "rubbing" on the floor, causing and an appropriate haptic effect to be produced to more realistically emulate a sensation of rubbing against a rough surface.

Figure 3:
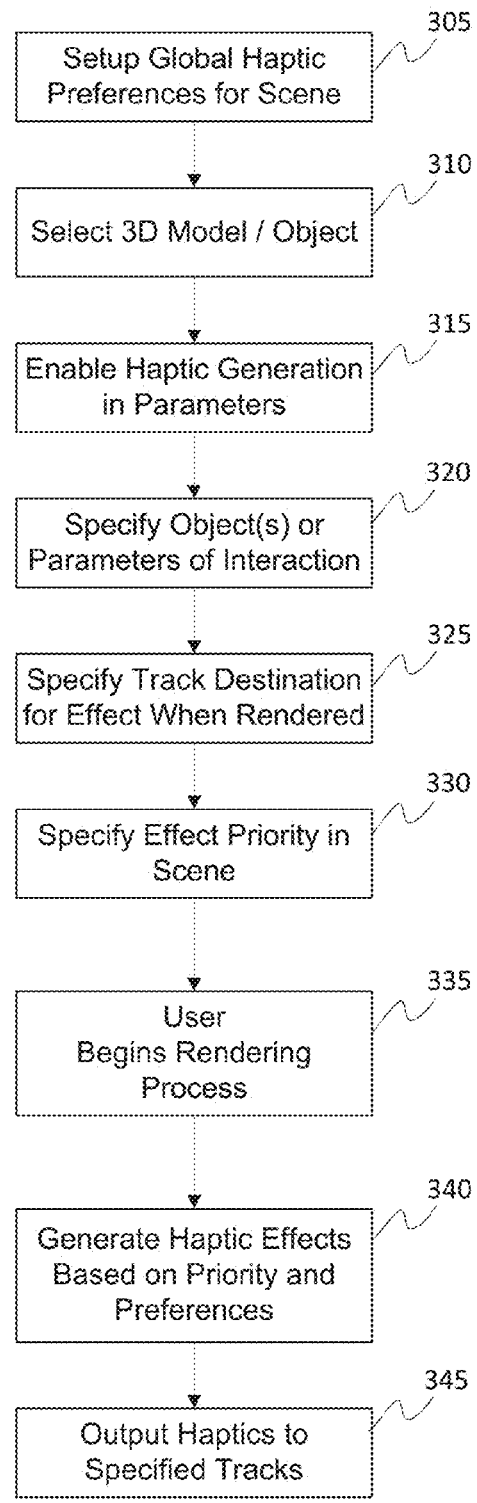
FIG. 3 is a flow diagram for a system of using virtual object information to generate haptic effects in a virtual environment in accordance with one embodiment.

FIG. 3 is a flow diagram for a system of using virtual object information to generate haptic effects in a virtual environment in accordance with one embodiment. In addition to the virtual sensor such as virtual sensor 19, an object in a virtual environment can be targeted to become similar to a large virtual sensor, with sensing being enabled across the entire object. The virtual environment can be 2D or 3D and rendered real time or produced.

At 305, global haptic preferences for the scene of the virtual environment can be set. These can include those environmental properties as discussed above, such as gravity, humidity, in-air versus in-water, and so forth. The properties can be input into the authoring environment via a haptic plugin module in the software. At 310, a model or object in the virtual environment can be selected. At 315, haptic generation can be enabled in the parameters for the object selected in 310. Other parameters in an object can include any type of physical property such as weight, density, material (which could be based on a preset), etc. At 320, the objects or parameters of interaction can be specified. For example, the parameters of interaction can include edge monitoring of an object so that when the edge of the object comes in contact with the edge of another object, a haptic effect is generated. The parameters can further specify how the intensity of the haptic effect can vary depending on the perceived or calculated intensity of the contact between the two objects.

At 325, an output haptic track can be identified that specifies where to save or play the haptic effect when the scene is rendered. For example, the haptic track can correspond to a haptic output device if the rendering is done in real time as in a video game, or the haptic track can be a saved format for playing back haptic information on haptic output devices if the rendering produces a video file.

At 330, haptic effect priority in the scene can be specified. For example, certain types of haptic effects can have preference in the scene. A rumble may have a lower priority than a press sensation, so that if an edge of the object contacts another object, a press can be felt distinctly over an accompanying rumble. In another example, haptic effects that could be generated from substantially constant contact with a floor object or the like may receive lower priority since a constant haptic effect from such contact may diminish the effects generated related to other contact in the scene. In embodiments utilizing a virtual sensor, such as virtual sensor 19, where multiple sensors are used, each of the sensors can have a different priority assigned so that sensors with less priority can generate less haptic effects or the haptic effects generated based on the virtual sensor data can be attenuated.

At 335, the scene is rendered. Rendering can be a production effort, such as with a movie or television show where rendering occurs and is saved to a video file, or rendering can be from a real time rendering engine, such as with a video game where rendering is output directly to a video display.

At 340, haptic effects are generated based on the priorities and preferences discussed in the preceding flow. This is where objects are detected and tracked through the scene. Objects edges (or wireframe edge points if appropriate) can be tracked through the scene. A haptic effect can be generated based on the tracking and movement of objects through the scene. For example, one algorithm may track a wireframe edge on a first object and a wireframe edge on a second object. The algorithm can then note that the first and second object edges come within approximately the same point in an X-Y-Z axes. The algorithm can then note that while within the same proximity, the first object edge rapidly accelerates away from the second object edge. The algorithm can determine that a haptic effect should be generated for the motion. One of skill in the art can develop algorithms for generating different haptic effects based on the acceleration and deceleration of objects (or virtual sensors), the proximity of the objects (or virtual sensors) to other objects, and environmental factors. Just like a sensor in the real-world analogue, the algorithm will be largely based on acceleration and position in the scene. One example of how this can work is discussed in greater detail below.

At 345, the generated haptics are output to the specified tracks. Haptic effects can be played on haptic output devices or saved to a haptic playback file. Haptic effects generated to specific haptic output devices can also be saved to a file as appropriate.

One example of how the flows of FIGS. 2 and 3 can be used in a virtual environment is with a virtual rubber ball object in the environment. The rubber ball can have associated with it a set of haptic properties that represent how the ball would feel, such as bounciness, texture, grip, give, etc., and act in standard gravity, such as properties related to weight, mass, volume, density, acceleration, etc. Likewise, a virtual wall in the same environment can have another set of haptic properties that represent how the wall would feel and act in standard gravity, such as texture, hardness, orientation, etc. Haptic effects can be generated based on a collision of the ball with the wall. Gravity can then be changed and haptic effects also changed based on the change in environmental properties (i.e., gravity) and whatever resulting change in the movement (if any) of the ball to the wall.

In another example of how the flows of FIGS. 2 and 3 can be used in a virtual environment, a game controller can include a rifle controller for game play in a first person shooter type game. A virtual sensor can be placed in the game on the butt, grip, and trigger of the gun and/or the respective shoulder, hand, and finger of the character or avatar. The physics of shooting the gun in the game, such as the kick when the gun is fired, can be captured by the virtual sensors located on the gun and character. Haptic effects can be generated that are sent to haptic output devices located on the controller at the butt, grip, and trigger to give the user haptic feedback without the need to specifically author the haptic effects.

Figure 4:
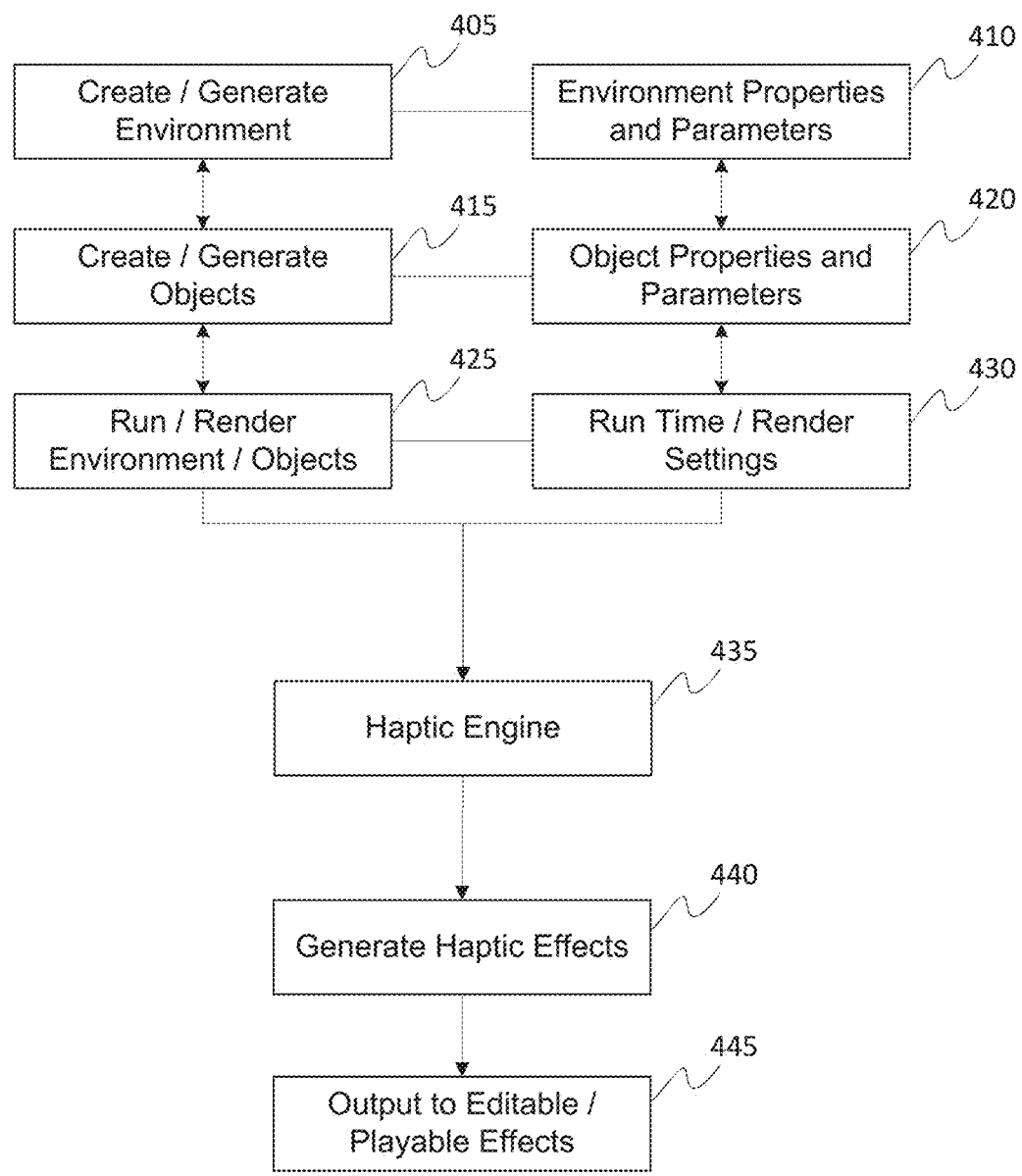
FIG. 4 is a flow diagram for a system of using virtual object information or sensors to generate haptic effects in a virtual environment in accordance with one embodiment.

FIG. 4 is a flow diagram for a system of using virtual object information or sensors to generate haptic effects in a virtual environment in accordance with one embodiment. At 405 the environment can be generated or created. This can be a 3D game engine, 3D modeling/animation platform, 2D game engine, or any other platform where virtual objects are interacting with other virtual objects. At 410, environment properties and parameters can be set. These can include properties analogous to the real world, such as physics, dimensionality, gravity, radiation/emanation, etc.

At 415, virtual objects can be created or generated in the virtual environment. At 420, the virtual objects can have object properties and parameters assigned, including properties analogous to the real world, such as weight, bounciness, mass, size, radiation/emanation, etc.

At 425, the environment can be run or rendered including virtual objects. The virtual objects and environments are aware of object interaction, such as collision detection, speed, motion, direction, orientation, and perspective. In embodiments using virtual sensors, such as virtual sensor 19, the sensors can serve as proxies for the actual objects or specific points of interest relative to an object. At 430, as part of the rendering or running process for the objects and environment, settings related to rendering or running the environment and objects can be used. Settings can include properties such as frame rate, resolution, numbers of triangles in objects, and so forth.

At 435, a haptic engine can be used to generate appropriate haptic effects based on the actions in the rendered or run environment. The engine can be driven by one or more algorithms based on style or other options. For example, as part of the settings, the perspective of the scene, e.g., that of a viewer/player or another camera angle, can be set which can alter the types of effect generated. Other options may include a targeted haptic platform and an optional haptic effect prioritization engine or mixer.

At 440, haptic effects can be generated by the haptic engine of 435, based on object or environmental properties. For example, upon rendering, the generation of haptics can be determined by the camera of the scene and the number of and priority of elements specified to print in the mix of haptic effects. In some embodiments, haptic effects can be rendered or previewed while rendering. At 445, the haptic effects can be output to editable or playable formats. Generation and output can be done at run time, such as during game play, animation playback, or on collision detection to a device capable of rendering the generated haptic effects, such as a haptic output device. Generation and output can be saved into a file storing a haptic track, similar to an audio stem file that isolates specific audio elements to one track.

One example where the flow of FIG. 4 can be used is in a virtual game environment where specific haptic effects can be pre-authored, but environmental effects dynamically generated in the game as if every object were fitted with multiple virtual sensors. Haptic effects can be generated and prioritized by a prioritization engine to determine if the generated haptic effect would play or if it would be supplanted by another effect. Haptic effects can be procedurally generated based on the action of the objects in the environment (e.g., determining surface strength, give, or texture and position relative to time (velocity/acceleration)) and properties of the world (e.g., gravity, relative perspective of the player, etc.).

Another example where the flow of FIG. 4 can be used is in the automatic generation of haptic effects during the creation of machinima (i.e., 3D animations that use a game engine for creating and rendering the actions).

Another example where the flow of FIG. 4 can be used is as part of a content creation tool used to create complex 3D animations (such as those employed by Pixar™ for their movies and shorts). Parameters, such as collision detection, could be set up globally to be written to specific tracks, either in the form of an audio file or in the form of a haptic file. Alternatively, individual objects can be enabled to emit/generate specific haptic effects such as: a character's foot/shoe being enabled to generate an effect based on a collision with another object (such as snow on the ground). The snow can have haptic properties that can be modified by the speed, angle, and size of the character's impact. Another haptic property could be a value to determine the priority/importance of the effect to be generated, as well as a setting to determine what file the haptic track can be written to. Upon rendering of the animation, the generation of haptic effects can be further determined by the camera angle of the scene and the number of and priority of elements specified to include in the haptic effect generation. In some embodiments, multiple haptic tracks can be output, depending on the environment and camera angles. The tracks can be based on the virtual camera used in the environment to enable a film editor editing raw footage, to include appropriate haptic content on rendering the final cut.

Figure 5:
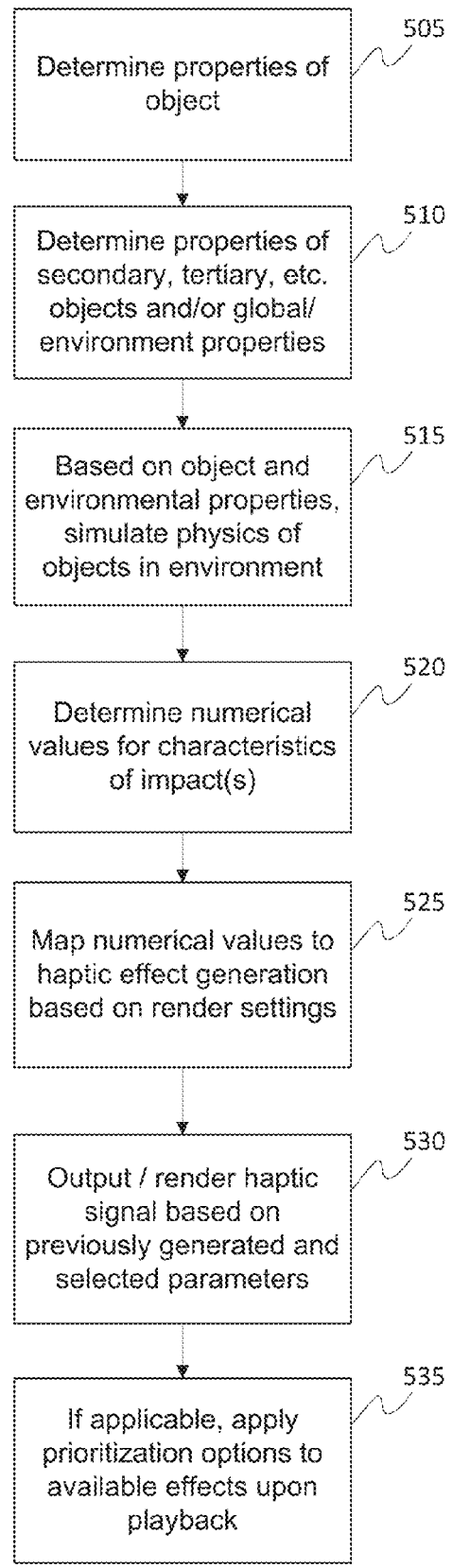
FIG. 5 is a flow diagram for a system of using virtual object information or sensors to generate haptic effects in a virtual environment in accordance with one embodiment.

FIG. 5 is a flow diagram for a system of using virtual object information or sensors to generate haptic effects in a virtual environment in accordance with one embodiment. The flow of FIG. 5 includes additional details on how a virtual interaction between virtual objects can be modeled for the purpose of generating haptic effects. At 505, properties of a virtual object are determined. Object properties can include things like mass, weight, material, acceleration, density, texture, etc.

At 510, properties of secondary, tertiary, etc. object(s) are determined along with global or environmental properties. Global or environmental properties can include things such as gravity, light source(s)/intensity, atmospheric conditions, default values for objects, and so forth.

At 515, based on object and environmental properties, simulate physics of objects in environment. Collision detection, for example, can determine the interaction of objects in the virtual space when they come in contact with each other. It should be noted that physics engines and collision detection algorithms are established technologies in gaming and computer generated graphics. However, the physics of the individual objects as they collide can determine an appropriate haptic response. For example, if one of the objects is a device with a rubber-like material, just as in real life, the rubber would absorb impact and lessen a haptic response. Described in physics terms, the rubber acts to decrease the absolute value of the acceleration of the object, which in turn decreases the force of the collision. Compared to an impact with a hard object, such as a bowling ball, the force of the collision would be greater, even for objects of the same mass because the absolute value of the acceleration (or the speed at which the ball slows a stop) would be less.

At 520, numerical values for the physical interactions of the objects can be determined, such as values for an impact(s)' strength, frequency, attack, and decay. For example, force equals mass times acceleration (F=ma). Thus, a numerical value for strength can be derived from collision data. Similarly, a frequency numerical value can be derived from collision data. Attack and decay can be derived from collision data and physical properties of objects, such as force per area of impact. As an example of how numerical values can be derived, a high force value would lead to a high impact strength. A high frequency of impact, such as two object sliding along each other creating essentially many impacts quickly, or a low frequency of impact, such as a ball bouncing up and down, can affect whether the determined haptic effect would be targeted on a high or low frequency haptic output device (such as a LRA or piezo actuator for high frequency effects or an ERM for low frequency effects).

At 525, numerical values are mapped to haptic effect generation based on render settings. Render settings can include real-time rendering settings such as in a game or settings associated with a production based rendering. Settings can also include a desired output type and/or available or targeted haptic output devices. For example, a haptic effect can include consideration for a targeted type of haptic output device or, if the targeted haptically-enabled device is known (the brand/model of a user's smartphone or gaming system), a tailored haptic effect/track can be created. In some embodiments, multiple haptic tracks can include information in each track specific to a type of haptically-enabled device.

Mapping of numerical values to haptic effects can depend on available haptic output devices, and can model collision impacts. For example, having calculated numerical values for a rubber ball hitting a hand, the numerical values can be mapped to a haptic effect. The haptic effect could include a magnitude, frequency, duration, and rate of decay for one or more haptic output devices.

At 530, a haptic signal can be output or rendered based on the haptic effect generated and parameters (e.g., outputting in real-time, writing to a haptic output track, etc.). At 535, if applicable, prioritization options can be applied to available haptic effects (or prioritization information included in the haptic tracks) on playback of the haptic effects. For example, in some embodiments, the haptic effects can be altered based on the camera angle or other environmental factors.

Figure 6:
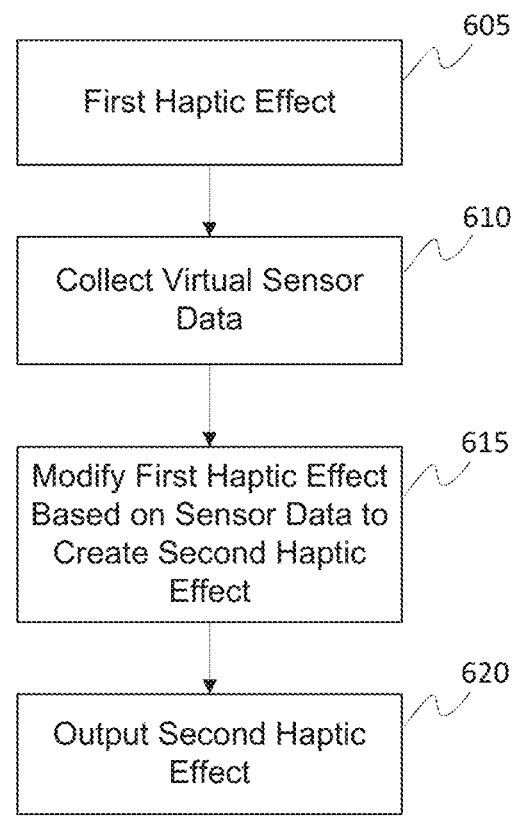
FIG. 6 is a flow diagram for a system of using virtual object information or sensors and existing haptic effect information to modify existing haptic effects in a virtual environment in accordance with one embodiment.

FIG. 6 is a flow diagram for a system of using virtual object information or sensors and existing haptic effect information to modify existing haptic effects in a virtual environment in accordance with one embodiment. As part of the haptic effect creation, an existing authored haptic effect can be altered. One reason why a developer might alter an authored haptic effect is to make the haptic effect more realistic. Other reasons can be because the targeted haptic output device is changed, the perspective of the animation is changed, the physical properties of the world are changed, and so forth. The flow of FIG. 6 can be performed on haptic effects generated by the flows of any of FIGS. 2-5.

At 605, a first haptic effect is read. The first haptic effect can be one that is authored or previously automatically generated by engine parameters or derived from an audio track. At 610, virtual sensor data (or virtual object data) is collected, such as in flow elements 215 of FIG. 2, 335 of FIG. 3, 435 of FIG. 4, and 515-525 of FIG. 5. Virtual sensor data can be based on location on an actor/object, motion of actor/object, properties of the environment (such as gravity, alternative haptic emitters, etc.), and the like.

At 615, the first haptic effect is modified based on sensor data to create a second haptic effect. The modification can be a modulation of the first haptic effect, such as, based on sensor data from a virtual accelerometer, pitch shifting the frequency of the original effect. Another modification can be a collision detection sensor to alter the strength of the effect when appropriate. Modification of the first haptic effect can be based on a library of real-world sensor based haptic effect information. In some embodiments, the second haptic effect can be output to replace the first haptic effect, and in some embodiments, the second haptic effect can be output as a separate haptic track to provide multiple available haptic effects tracks that can be selected depending on changes to the environment or camera angles. One of skill will understand, of course, that a third haptic effect can be created by modifying the first or second haptic effects, and so forth. At 620, the second effect is output and/or played (similar to the outputting of a haptic track as described above).

Figure 7:
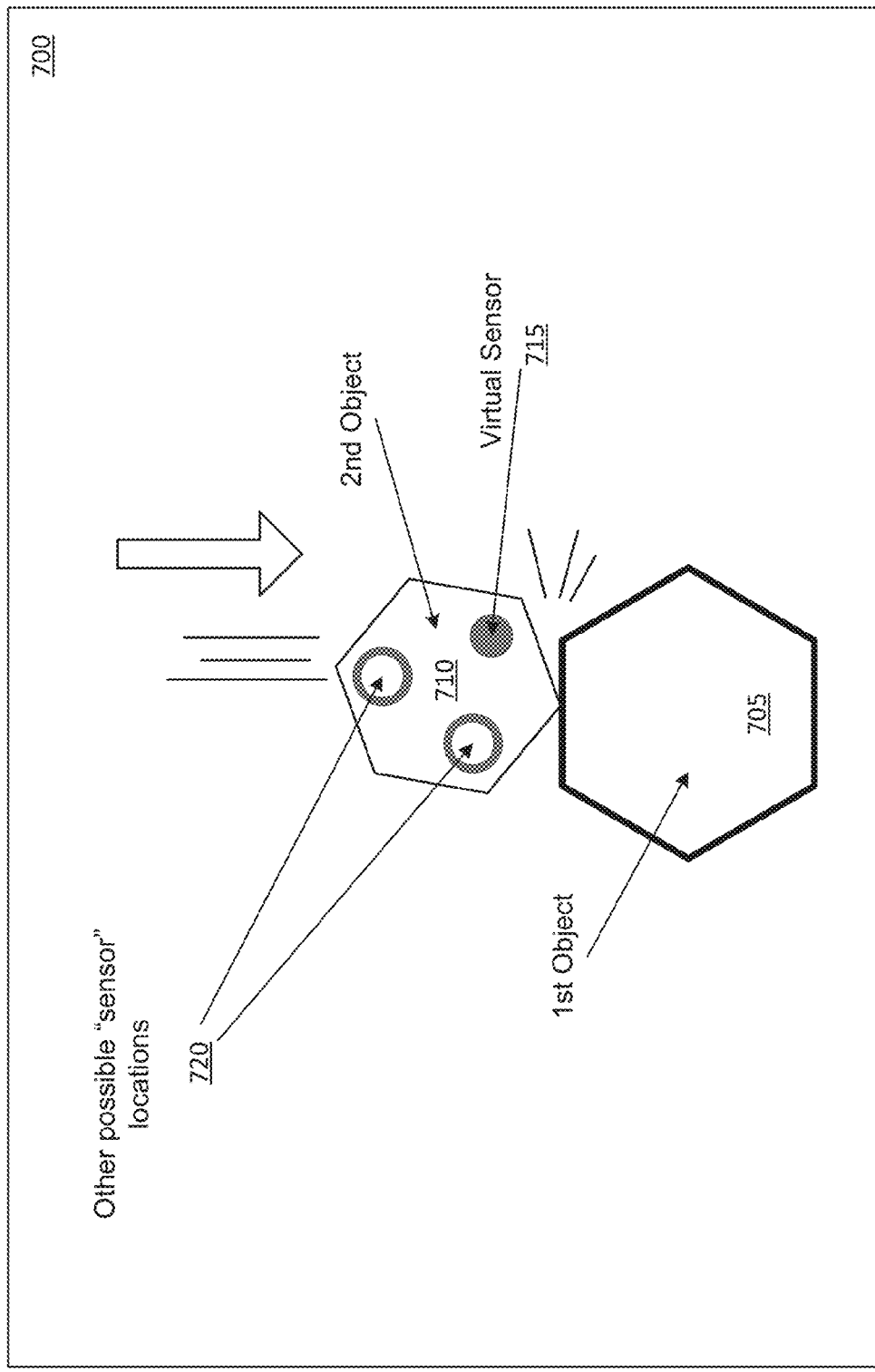
FIG. 7 is an illustration of two objects colliding in a virtual environment in accordance with one embodiment.

FIG. 7 is an illustration of two objects colliding in a virtual environment in accordance with one embodiment. A virtual environment 700 comprises a first object 705 and a second object 710. A virtual sensor 715 is located on second object 710. Other possible locations for the sensor include the locations 720 on the object, amongst others. Object 710 moves downward toward object 705, colliding with object 705. Virtual sensor 715 gathers data about the collision, including data such as (de)acceleration, collision intensity, surface friction between objects 705 and 710, and positional data of the two objects as time proceeds forward from the point of collision. Based on the sensor data, haptic effects can be generated in accordance with the embodiments herein. If sensor 715 had been placed at another location 720, then the haptic effects generated would be different.

As disclosed, embodiments incorporate virtual sensor or virtual object tracking in a virtual environment to gather data about the objects (or sensors) in the environment and rendering or run time. Based on the sensor data and properties of the environment and the objects, haptic effects are generated to provide an interactive atmosphere for a user.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A system for generating haptic effects comprising:
   a virtual environment including virtual objects;
   at least one programmatic virtual sensor placed on at least one virtual object in the virtual environment;
   a rendering engine configured to render the virtual environment;
   a virtual sensor module configured to receive virtual sensor data from the at least one virtual sensor and to calculate sensor output data based on the virtual sensor data;
   a haptic track generator configured to generate a haptic track based on the sensor output data.

2. The system of claim 1, wherein the virtual sensor data includes at least position and time data and the calculated sensor output data includes at least acceleration data of the virtual sensor.

3. The system of claim 1, wherein the haptic track generator is further configured to modify the haptic track based on the sensor output data.

4. The system of claim 1, further comprising a prioritization module configured to receive priority information for available haptic effects and for available virtual sensors.

5. The system of claim 1, wherein the haptic track generator is further configured to receive a track destination for the haptic track.

6. A method of generating haptic effects comprising:
   placing at least one programmatic virtual sensor placed on at least one virtual object in a virtual environment;
   rendering the virtual environment via a rendering engine;
   receiving virtual sensor data from the at least one virtual sensor;
   calculating sensor output data based on the virtual sensor data; and
   generating a haptic track based on the sensor output data.

7. The method of claim 6, wherein the virtual sensor data includes at least position and time data and the calculated sensor output data includes at least acceleration data of the virtual sensor.

8. The method of claim 6, wherein the generating modifies the haptic track based on the sensor output data.

9. The method of 6, further comprising:
   receiving priority information for available haptic effects and for available virtual sensors.

10. The method of claim 6, further comprising:
    receiving a track destination for generating the haptic track.

11. A system for generating haptic effects comprising:
    a virtual environment including virtual objects;
    a programmatic virtual sensor placed on a virtual object in the virtual environment;
    a collision detection engine configured to collect collision information from the virtual sensor for at least one collision between two virtual objects;
    a rendering engine configured to render the virtual environment;
    a physics engine configured to analyze collision information and determine numerical values for physical properties of the collision;
    a haptic effect mapper configured to map the numerical values to haptic effects; and
    a haptic track generator configured to generate a haptic track based on mapped haptic effects.

12. The system of claim 11, wherein the physical properties include object speed and acceleration data at a particular time.

13. The system of claim 11, wherein the haptic track generator is further configured to modify the haptic track based on the numerical values.

14. The system of claim 11, further comprising a prioritization module configured to receive priority information for mapped haptic effects.

15. The system of claim 11, wherein the haptic track generator is further configured to receive a track destination for the haptic track.

16. A method for generating haptic effects comprising:
    placing a programmatic virtual sensor placed on a virtual object in a virtual environment;
    collecting collision information from the virtual sensor for at least one collision between two virtual objects in a virtual environment;
    rendering the virtual environment;
    calculating numerical values for physical properties of the collision based on the collision information;
    mapping the numerical values to haptic effects; and
    generating a haptic track based on mapped haptic effects.

17. The method of claim 16, wherein the physical properties include object speed and acceleration data at a particular time.

18. The method of claim 16, wherein the generating modifies the haptic track based on the numerical data.

19. The method of 16, further comprising:
receiving priority information for mapped haptic effects.

20. The method of claim 16, further comprising:
receiving a track destination for generating the haptic track.

21. The method according to claim 16, wherein the virtual environment comprises a virtual reality environment.

22. The method according to claim 16, wherein the virtual environment comprises a 3D modeling environment.

23. The method according to claim 22, wherein the 3D modeling environment comprises an augmented reality environment.

\* \* \* \* \*